(12) United States Patent
Konoplev

(10) Patent No.: US 8,265,410 B1
(45) Date of Patent: Sep. 11, 2012

(54) AUTOMATIC CORRECTION AND ENHANCEMENT OF FACIAL IMAGES

(75) Inventor: Alexey Konoplev, St. Petersburg (RU)

(73) Assignee: Luxand, Inc., Alexandria, VA (US)

( * ) Notice: Subject to any disclaimer, the term of this patent is extended or adjusted under 35 U.S.C. 154(b) by 343 days.

(21) Appl. No.: 12/815,861

(22) Filed: Jun. 15, 2010

Related U.S. Application Data

(60) Provisional application No. 61/224,853, filed on Jul. 11, 2009.

(51) Int. Cl.
*G06K 9/40* (2006.01)
*G06K 9/00* (2006.01)
*G06K 9/34* (2006.01)

(52) U.S. Cl. ........ 382/254; 382/118; 382/162; 382/167; 382/168; 382/173; 382/260; 382/275

(58) Field of Classification Search .................. 382/118, 382/162, 167, 168, 173, 254, 260, 275
See application file for complete search history.

(56) References Cited

U.S. PATENT DOCUMENTS

| 6,996,287 B1 * | 2/2006 | Weiss ............................ 382/260 |
| 7,082,211 B2 * | 7/2006 | Simon et al. ................... 382/118 |
| 7,187,788 B2 * | 3/2007 | Simon et al. ................... 382/118 |
| 7,212,657 B2 * | 5/2007 | Simon et al. ................... 382/118 |
| 2003/0223622 A1 * | 12/2003 | Simon et al. ................... 382/118 |
| 2004/0170337 A1 * | 9/2004 | Simon et al. ................... 382/254 |
| 2004/0208363 A1 * | 10/2004 | Berge et al. ................... 382/167 |
| 2006/0228040 A1 * | 10/2006 | Simon et al. ................... 382/254 |

* cited by examiner

*Primary Examiner* — Bernard Krasnic
(74) *Attorney, Agent, or Firm* — Bardmesser Law Group

(57) ABSTRACT

A system, method and computer program product for correction and enhancement of digital images containing portraits or images of human faces by automatically detecting imperfections in an original facial image and correcting them in order to enhance the original image quality. The imperfections can be various skin blemishes, birth marks, pimples, freckles, wrinkles, etc. The facial images are detected and the imperfections are recognized. Then, the imperfections are automatically corrected by selecting a most suitable skin color using a histogram of distribution of color values on a face. A white balance and appropriate colors are set for an image. The corrected image is combined with the original image for preservations of details.

13 Claims, 11 Drawing Sheets

AUTOMATIC CORRECTION AND ENHANCEMENT OF FACIAL IMAGES

CROSS-REFERENCE TO RELATED APPLICATIONS

This application claims priority of a Provisional U.S. Patent Application No. 61/224,853, filed on Jul. 11, 2009, which is incorporated by reference herein in its entirety.

BACKGROUND OF THE INVENTION

1. Field of the Invention

The present invention is related to digital image processing technology, and more particularly, to detection and correction of imperfections on a digital facial image.

2. Description of the Related Art

Correcting photographs of people's faces has been done since invention of photography. Human portraits were always corrected in order not to show things like bumps, birth marks, pimples, freckles, wrinkles, etc. The photographs were corrected manually and corrections were made on the actual photographs or on negatives or films by hand. This was always a tedious process requiring special artistic skill.

With the arrival of a digital photography a need to correct or improve pictures of human faces remained the same. Numerous digital photo editor kits exist, such as Adobe Photoshop™. The photo editors perform image corrections by automatically correcting white balance and setting the most natural colors. They also allow users to perform similar operations with the digital images as the photographers of the past did by hand. For example, a user can select a desired color and air brush or cover up anything on the digital portrait using this color "paint." However, it remains essentially somewhat of a tedious manual process that also takes a lot of time and requires special skills.

For example, digitally removing or even partially covering up freckles on an image of a human face can take a long time. Yet, depending on a photo editor used and a skill of the person using it, a face still looks more or less artificial on the portrait. In other words, the human face on a digital picture looks unnatural and it can be seen that the image was "doctored." These altered images are often referred to as having been "photoshopped."

Most of these visually recognizable corrections to the image are caused by the manual nature of these corrections, for example, a user trying to cover up a pimple on a digital image of a face. Typically, the user selects a color and a place where he wants to apply the color brush. Therefore, the corrected image only looks as good as user's color perception and hand accuracy.

It is apparent that improved automated techniques for improving the portrait images are desired. Accordingly, there is a need in the art for a system and method that addresses the need for automatic recognition and correction of the undesirable features of portrait images.

SUMMARY OF THE INVENTION

The present invention is intended as a method and system for correction and enhancement of digital images containing portraits or images of human faces, that substantially obviates one or several of the disadvantages of the related art.

In one aspect there is provided a system, method and computer program product for automatically detecting imperfections in a facial image and correcting them in order to enhance the original image quality. The imperfections addressed by the exemplary embodiment can be various skin blemishes, birth marks, pimples, freckles, wrinkles, etc.

According to an exemplary embodiment, the facial images are detected and the imperfections are recognized. Then, the imperfections are automatically corrected by selecting a most suitable skin color using a histogram of distributions of color values on a face. White balance and color corrections of the image are also performed using a histogram of color distributions over the entire image.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
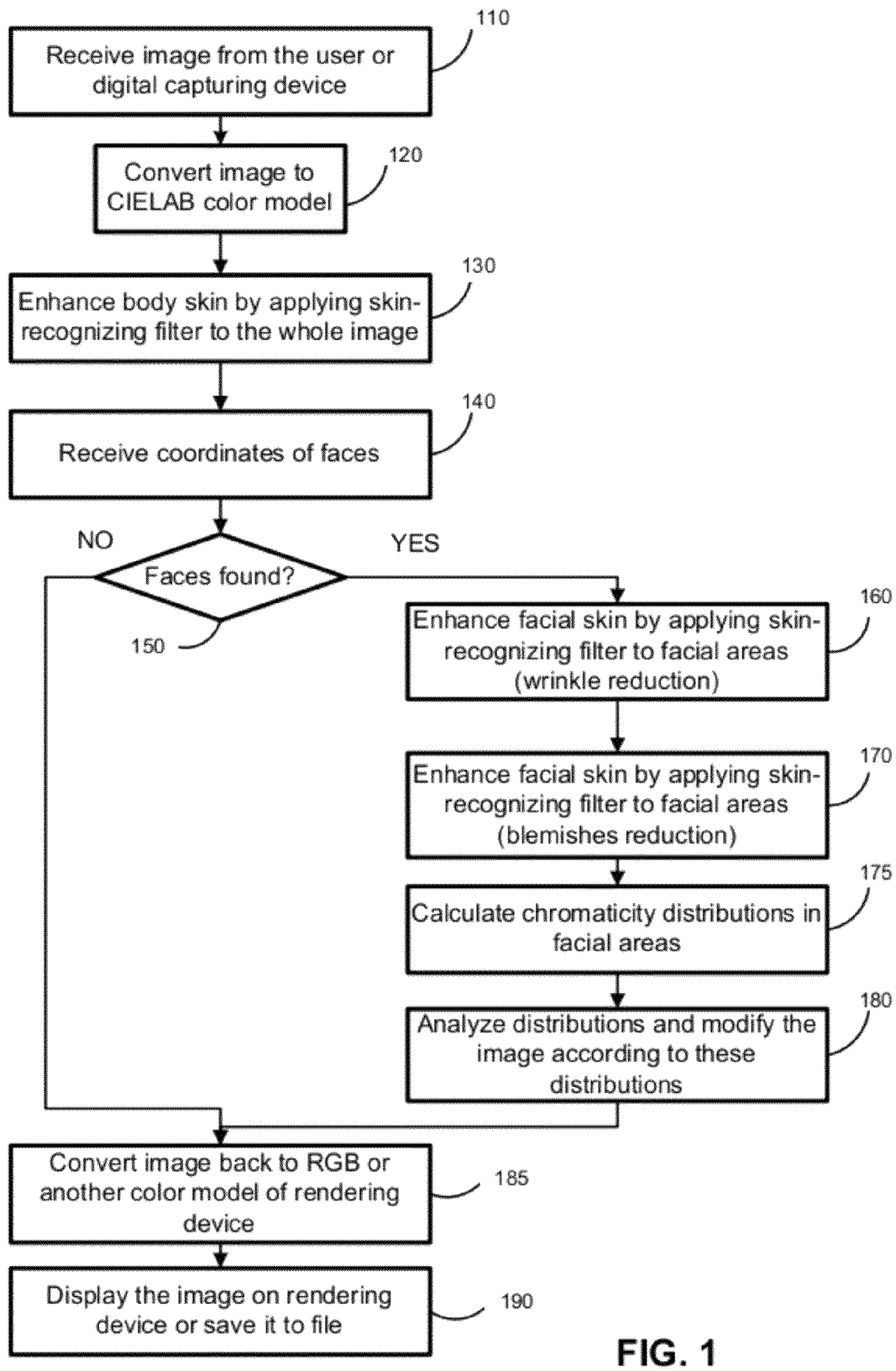
FIG. 1 illustrates a flow chart of a method for image enhancement, in accordance with the exemplary embodiment.

Reference will now be made in detail to the preferred embodiments of the present invention, examples of which are illustrated in the accompanying drawings.

According to the exemplary embodiment, a method, system and computer program product for automatic correction and enhancement of digital images containing portraits or images of human faces are provided.

In one aspect, there is provided a method for automated enhancement of digital images containing portraits or images of human faces by correcting imperfections such as wrinkles, skin blemishes, freckles, pimples, etc. The proposed method employs facial coordinates of individuals present in a picture.

According to the exemplary embodiment, the facial coordinates are either known or can be found by an automatic face detection technique.

An image is converted from an RGB to another color model (for example, a CIELAB model). Some other device-independent color models can be used (for example, an XYZ model, an HSV model, an HSL model, etc.). Note that perceptually uniform color models (such as, for example, CIECAM97, CIECAM02, iCAM) are preferred. These color models provide very smooth image corrections, since color matching in these models looks more natural. Regarding the color models, see generally: CIELAB: K. McLaren, "The development of the CIE 1976 (L*a*b*) uniform colour-space and colour-difference formula", Journal of the Society of Dyers and Colourists 92, pp. 338-341 (1976); G. A. Agoston, Color Theory and Its Application in Art and Design, Heidelberg 1979; XYZ: Smith, Thomas; Guild, John (1931-32). "The C.I.E. colorimetric standards and their use". Transactions of the Optical Society 33 (3): 73-134; HSV: Alvy Ray Smith (August 1978); "Color gamut transform pairs", Computer Graphics 12(3): 12-19; HSL: George H. Joblove and Donald Greenberg (August 1978). "Color spaces for computer graphics". Computer Graphics 12(3): 20-25; CIECAM97: Fairchild, Mark D. (August 2000). "A Revision of CIECAM97s for Practical Applications". Color Research & Applications (Wiley Interscience) 25 (4): 260-266; CIECAM02: Moroney, Nathan; Fairchild, Mark D.; Hunt, Robert W. G.; Li, Changjun; Luo, M. Ronnier; Newman, Todd (Nov. 12, 2002). "The CIECAM02 Color Appearance Model". IS&T/SID Tenth Color Imaging Conference. Scottsdale, Ariz.: The Society for Imaging Science and Technology. ISBN 0-89208-241-0; iCAM: M. D. Fairchild and G. M. Johnson, "The iCAM framework for image appearance, image differences, and image quality," Journal of Electronic Imaging, in press (2004).

The entire image is processed through a smoothing filter. This filter uses a set of filtering parameters for noise removal. First, skin areas are recognized in the image and are processed through the smoothing filter for removing skin imperfections. Then, parts of the image containing human faces are processed through the smoothing filter using a different set of filtering parameters for wrinkle removal. Subsequently, the parts of the image containing the human faces are processed through the same smoothing filter using yet another set of parameters for removing round spots from the faces (i.e., pimples or other blemishes).

According to the exemplary embodiment, a distribution of various color parameters of the image is selected and a histogram of values of the color parameters for the image is generated. Here, the parameters are those that in some fashion depend on the color of the pixel in the color models. For example, in the CIELAB model, these are components that characterize the color, i.e., a* иb*, In the HSV model, they are H (Hue) and S (Saturation) components. Also, the parameters can be derived from the components using some formula. White balance and color corrections of the image are automatically performed using the histogram.

The image portion containing a human face is automatically selected. For this, a histogram of values of the color parameters for the human face image is generated. Alternatively, an average histogram can be generated for a number of faces on the image.

The histogram is automatically analyzed in order to determine how to change the color distribution for the face area of the image or for the whole image to achieve the most natural colors. In the exemplary embodiment, a following method for generating and analyzing the histogram can be used. A mean value is calculated for distribution of each of the parameters.

Also, a peak value (i.e., a most frequently occurring value) is calculated for distribution of each of the parameters. Then, a dominant parameter value can be calculated as d=(mean+peak)/2.

The offset value for each of the parameters is calculated as $$\text{offset} = \Sigma_i \sqrt{|i-d|*h_i}$$

where d—is the dominant parameter and h—is the histogram value. Thus, each value of the histogram is multiplied by a distance between the given histogram value to the dominant value. Alternatively, the offset value can be calculated as $k^{th}$-statistical moment (such as variance) of the histogram. Then, it can be determined how to change the color distribution for the face area of the image or for the whole image for achieving the most natural color tone. The determination is based on pre-stored natural facial color distributions. For these distributions, the "natural" dominant value and the "natural" offset values are calculated.

Then, each of the parameters of the image being corrected is moved to the distance equaling a difference between the calculated dominant value and the "natural" value. Subsequently, each of the image parameters is multiplied by a result of division of the "natural" offset value by the calculated offset value for the respective parameter.

Correction of color distribution in the image can be done as a non-linear operation. In other words, parameters having small absolute values can be affected more than the parameters with large values, in order to avoid excessive color saturation or intensity.

Alternatively, color parameters of each pixel can be corrected depending on weather the pixel belongs to a facial skin. Then, the color parameters change on a facial skin, while the objects in the foreground, such as hair and glasses will remain untouched.

In order to determine a degree of matching the color parameters of a given pixel to the colors parameters of the skin, a statistic models can be used. For example, a statistic model accepting that distribution of pixel parameter values is Gaussian distribution with its center in the dominant value and with a standard offset equaling to a standard deviation of a histogram.

Then, a degree of matching of the pixel to the facial skin can be calculated as:

$$V = e^{-0.5 * \sum_i \frac{(x_i - d_i)^2}{a_i * dev_i^2}}$$

Where:

i covers given color parameters (i.e., for example, L, a*, b* in CIELAB model);

$x_i$—a value of the given parameter for a current pixel;

$d_i$—dominant value of the histogram for i parameter;

$dev_i$—a standard deviation of the histogram for i parameter;

$a_i$—a calibration value.

Then, the color parameters for each pixel are corrected to degree proportional to V. For example, if V=1, then the color parameters of a given pixel will be corrected to 100%. If V=0, the color parameter of the pixel remain unchanged.

According to the exemplary embodiment, the correction of image can enhance the contrast of the facial part of the image, while saving the contrast of other objects on the image.

Enhanced contrast creates deeper lighting of the face. Thus, a new value of brightness L' needs to be calculated:

$$L'=(L-d)*a+d$$

Where: a—contrast parameter (e.g., 1.5 increase of contrast), d—dominant value.

Then, taking to account a degree of matching of the pixel to the skin V, an actual brightness value for the pixel is calculated as $V*L'+(1-V)*L$ Alternatively, the color parameters of the background (i.e., all the pixels that do not belong to skin) can be processed separately. An image modification, which corrects the dark pixels, not belonging to the skin, towards "colder" color (i.e., moves them in the direction of blue) and also desaturates the dark pixels (i.e., makes them less intense) appears to be more pleasing visually. In the CIELAB model, a degree, to which a given pixel belongs to a shadow, can be calculated as:

$$shadow=e^{-0.5*L^2},$$

Then, the values of parameters a*, b* can be calculated as:

$$a*'=shadow*(a**c)+(1-shadow)*a*$$

$$b*'=shadow*(b**c)+(1-shadow)*b*$$

Where c—a degree of desaturation (e.g., 0.3). Then, taking into account a degree of matching of the pixel to the skin V, the values of parameters a* and b* for this pixel will move towards above calculated a*' and b*'. Note that the closer is V to zero (i.e., the more pixel matches the skin), the closer the values a* and b* get to a*' and b*'.

A resulting image can be converted back to an RGB color model. Alternatively, it can be converted into another color model of an image rendering device. The smoothing filter employed by the exemplary embodiment has a standard filtering function using a special filtering parameter "radius".

The filter performs filtering operations using a plurality of radii. The filtering operation is performed sequentially on all image pixels. The statistical distribution of each pixel of a surrounding area is analyzed. A size of the surrounding area for each pixel is determined by the radius. The surrounding area can be of a square or of a round shape. The pixels located on an edge are the edge pixels of the surrounding area (i.e., pixels located along the perimeter of the square or the pixels located on the circle).

For the set of the edge pixels following values are calculated:
- a minimum value;
- a maximum value;
- an average value;
- a median value;
- a first derivative; and
- a second derivative.

Then, by analyzing these values and comparing them against intensity and color of a current pixel (i.e., the pixel being filtered), the current pixel can be considered as a "noise" pixel or as a pixel susceptible to being colored over by a certain level. The digital noise pixel is identified using it intensity value. If the pixel intensity value does not exceed a minimal value for the surrounding area increased by a certain threshold value or if the pixel intensity value exceeds the maximum value for the surrounding area decreased by the threshold value, the pixel is considered to be "noise".

A level to which the pixel needs to be colored over is determined by the reverse proportion of a difference of a tone used for coloring over and the color of the pixel. The analogous parameters are used for wrinkle identification, while a higher level of the pixel coloring over is used.

According to the exemplary embodiment, facial spots (such as pimples) are processed by analyzing a second derivative of the edge pixel value. The level of pixel coloring over is set based on the second derivative of the edge pixel value. The higher is a maximum value of the second derivative of the edge pixels of the surrounding area the lower is the level of the pixel coloring over is used. In any case, in order to set up a color for coloring over a noise pixel, an average value of the pixels of the edge area is used. Alternatively a median value of the pixels of the edge area can be used.

FIG. 1 illustrates a flow chart of a method for image enhancement, in accordance with the exemplary embodiment. An image is received from a user or from an image capturing device in step 110. The image is converted to CIELAB color model in step 120. Note that any of the device-independent color models (for example, XYZ, HSV, HSL models, etc.) or the perceptually uniform color models (such as, for example, CIECAM97, CIECAM02, iCAM) can be used.

A skin recognition filter is used on the whole image for enhancing body skin appearance on the image in step 130. The filter uses skin imperfection reducing parameters. Face coordinates are acquired from a face detection module (or from a user) in step 140. If, in step 150, faces are found in the image, the facial skin is enhanced by the skin-recognition filter applied to detected facial areas of the image in step 160. The filter uses wrinkle reducing parameters.

Then, in step 170, the facial skin is enhanced by the skin-recognition filter applied to detected facial areas using spots/blemishes reducing parameters. Chromaticity distributions in the facial areas are calculated in step 175. The distributions are analyzed and the image is modified according to the distributions in step 180. The modified image is converted back to an RGB color model or to another color model of an image rendering device in step 185. The image is displayed to a user via the image rendering device or saved in step 190.

Figure 2:
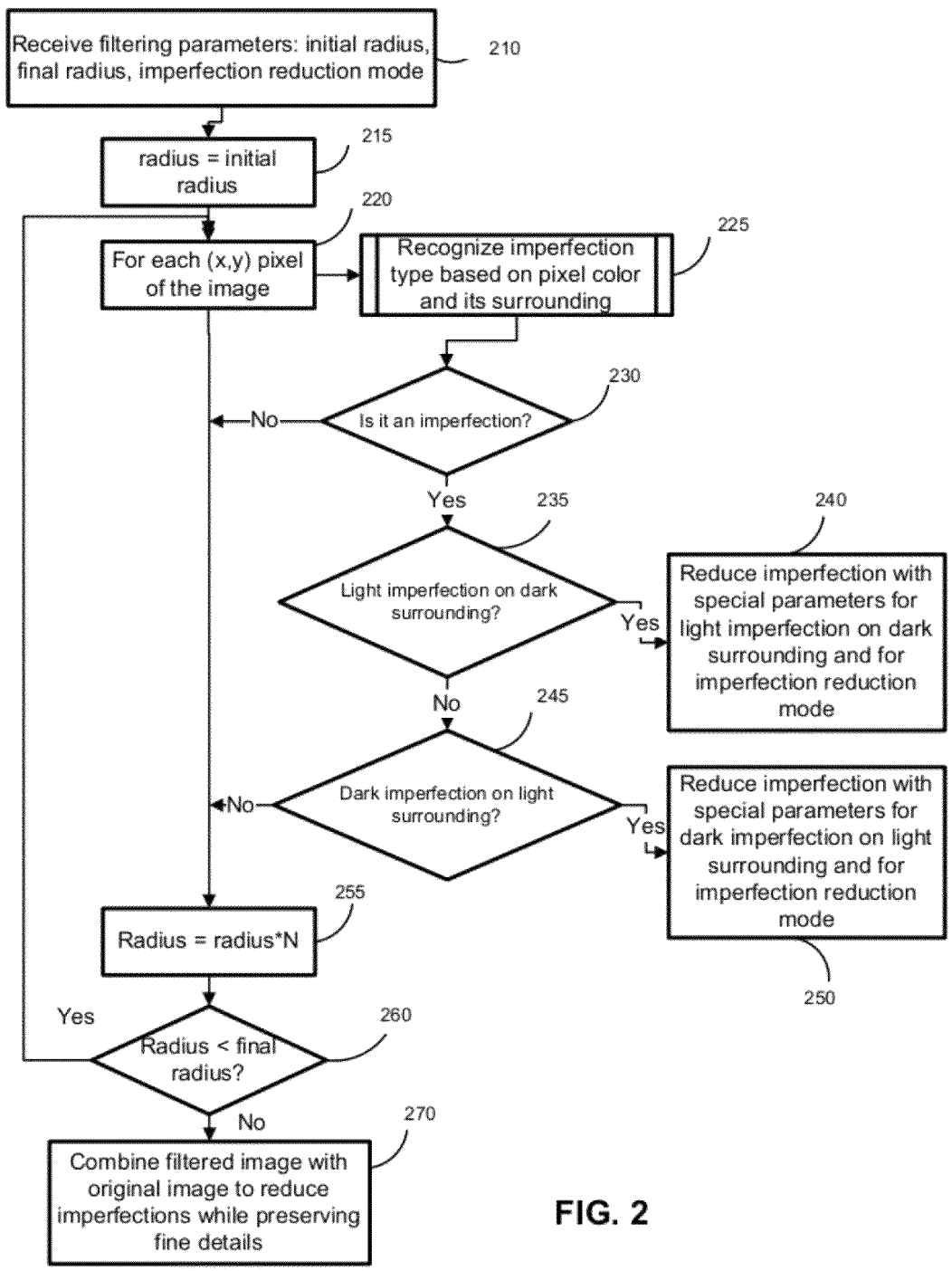
FIG. 2 illustrates a flow chart of image filtering, in accordance with the exemplary embodiment.

FIG. 2 illustrates a flow chart of a skin recognition filtering, in accordance with the exemplary embodiment. Filtering parameters are received in step 210. The filtering parameters are: an initial radius, a final radius, an imperfection reduction mode (i.e., body imperfection reductions, wrinkle reductions, spots/blemishes reduction). The initial radius is applied to all pixels of the image in step 215. For each pixel with coordinates X and Y in step 220, an imperfection type is recognized based on a color of the pixel and its surrounding area determined by the initial radius in step 225.

If the imperfection is detected in step 230, it is determined, in step 235, if the imperfection is a light imperfection on a dark surrounding. If the imperfection is a light imperfection on a dark surrounding, in step 240 the imperfection is reduced using special parameters for this type of the imperfection for the imperfection reduction mode.

If a dark imperfection on a light surrounding is detected in step 245, the imperfection is reduced using special parameters for this type of the imperfection and for the imperfection reduction mode in step 250. Then, in step 255, the radius is increased for each pixel and the same steps of recognition and reducing the imperfections are repeated until the radius reaches the final radius value (see step 260).

The radius can be increased by an arbitrary value. However, an exponentially growing radius (i.e., radius=radius*1.195) produces the most efficient visual results. The processing of the image pixels is stopped when the radius increases up to the maximum radius. At this point the filtered image is combined with an original image (see step 270). Thus, the imperfections are corrected and the image details are preserved.

Figure 3:
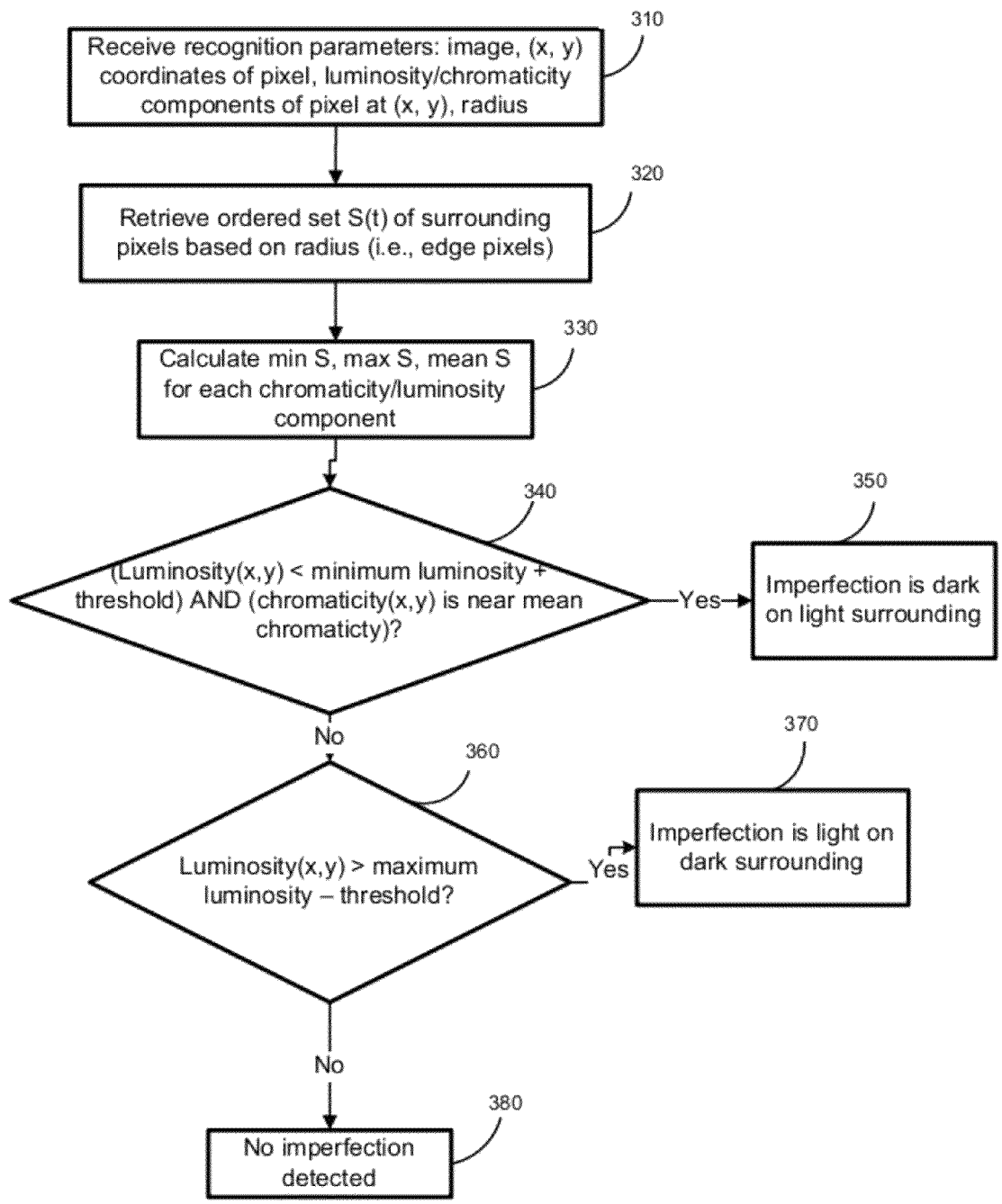
FIG. 3 illustrates a flow chart of imperfection recognition in an image, in accordance with the exemplary embodiment.

FIG. 3 illustrates a flow chart of imperfection recognition in an image, in accordance with the exemplary embodiment. Recognition parameters are received in step 310. The recognition parameters are: an image, coordinates (x, y) of a pixel, luminosity/chromaticity components of the pixel at the coordinates (x, y), and a current radius. A set of surrounding pixels (i.e., edge pixels) is defined by the radius (see step 320). The following values for the edge pixels are calculated for luminosity/chromaticity: a minimum pixel value, a maximum pixel value and a mean pixel value (see step 330).

Then, in step 340, if the calculated luminosity value for the pixel located at the coordinates (x, y) is less than a sum of the minimum luminosity and a threshold value, and the chromaticity is equal to (or near) the mean value, the imperfection is a dark imperfection on a light surrounding (see step 350). In step 360, if the luminosity of the pixel located at the coordinates (x, y) is larger than the maximum luminosity minus the threshold value, the imperfection is a light imperfection on the dark surrounding (see step 370). Otherwise, the imperfections are not found in the image (see step 380).

Figure 4:
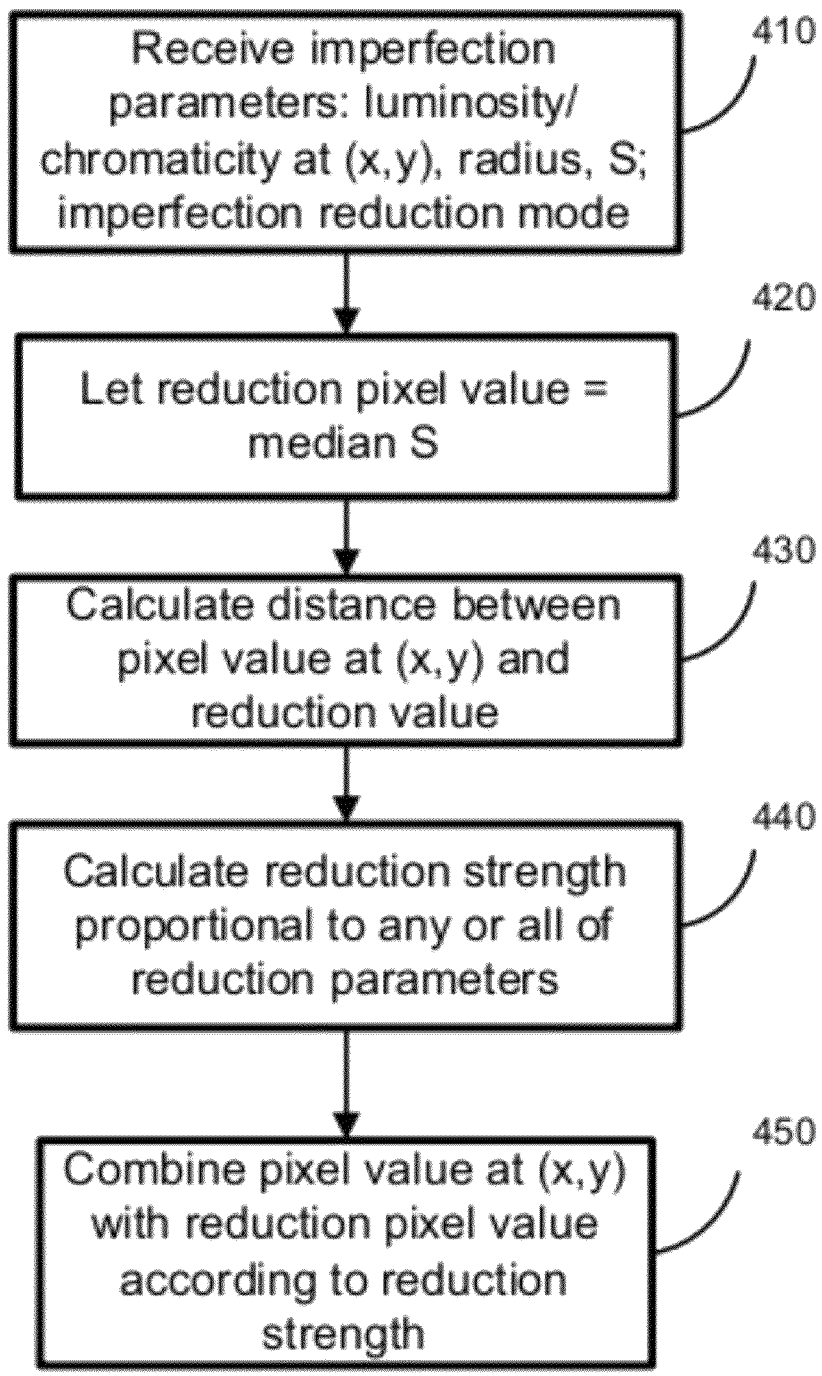
FIG. 4 illustrates a flow chart for reduction of imperfections in accordance with the exemplary embodiment.

FIG. 4 illustrates a flow chart for reduction of imperfections, in accordance with the exemplary embodiment. The imperfection parameters are received in step 410. The imperfection parameters are: luminosity/chromaticity of a pixel at coordinate (x, y), radius, a set of surrounding pixels (S), imperfection reduction mode (i.e., a set of reduction parameters to be used). A reduction pixel value is calculated in step 420. Any value calculated in step 420 on the set of surrounding pixels (S) can be used as a reduction value (such as, for example, a mean value).

In the exemplary flow chart, a reduction value is a median of S (see step 420). A distance between the pixel value at coordinate (x, y) and the reduction value is calculated in step 430. Note that the distance can be calculated using pixel luminosity and chromaticity. Luminosity alone can also be used. Reduction strength proportional to any or all of the reduction parameters is calculated in step 440. The reduction parameters are: the distance, the radius, a maximum of a first derivative of the set of the surrounding pixels (|S'(t)|) used for body imperfection or wrinkle reducing mode, a maximum of a second derivative of the set of the surrounding pixels (|S"(t)|) and a minimum of the set of the surrounding pixels used for spot/blemishes reducing mode. Also, maximum/minimum/average/median values of S(t), |S'(t)| or |S"(t)| can also be used.

A proportion for calculating the reduction strength can be a Gaussian function:

reduction strength=$a$*exp($-k$*(parameter$_1$+parameter$_2$+ ... )$^2$), where Gaussian values can be selected as a=1 and k near 1000. Note that other functions can also be used, as long as they decrease with the reduction parameter increase.

The pixel value at the coordinate (x, y) is combined with the reduction pixel value according to the reduction strength in step 450. The reduction value is used as follows:

(old value of the pixel at (x, y))*(1−reduction strength)+(reduction value)*(reduction strength)

In other words, a linear interpolation is used (if the reduction strength is equal to zero, then the old value will remain, if it is 1, then the reduction value itself will be the new value).

Figure 5:
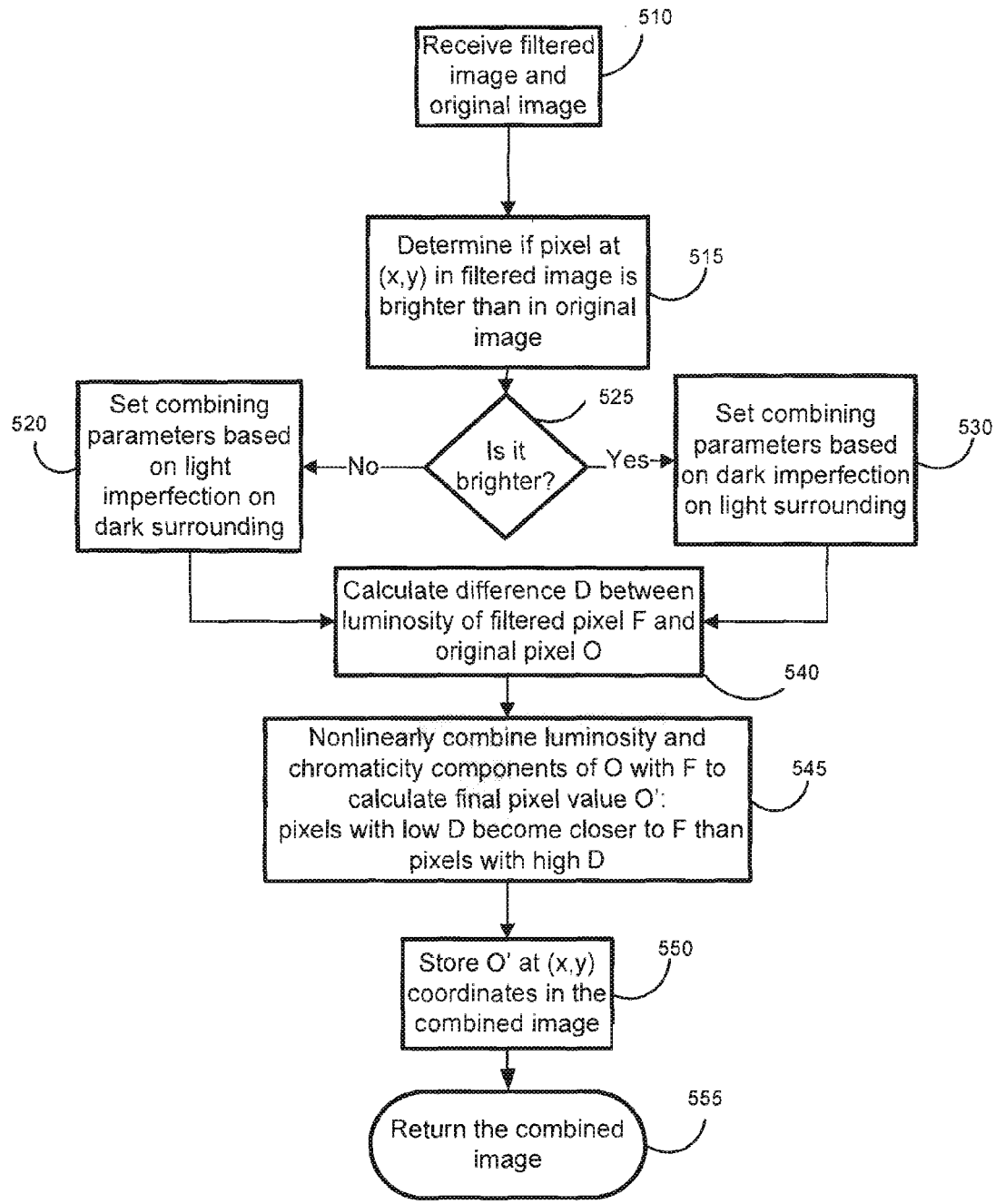
FIG. 5 illustrates a flow chart for combining filtered image with the original image, in accordance with the exemplary embodiment.

FIG. 5 illustrates a flow chart for combining filtered image with the original image, in accordance with the exemplary embodiment. Filtered and original images are received in step 510. For each pixel at coordinates (x, y) in the filtered image it is determined, in step 515, if the pixel in the filtered image is brighter than in the original image. If it is brighter (see step 525), combining parameters are set in step 530 based on a dark imperfection on a light surrounding. If it is not brighter in step 525, the combining parameters are set based on a light imperfection on dark surrounding (see step 520). Then, a difference (D) in luminosity of a filtered pixel (F) and an original pixel (O) is calculated in step 540.

A luminosity and chromaticity values of pixels O and F are nonlinearly combined and a final pixel value O' is calculated in step 545. Thus, the pixels with low D become closer to the pixel F than the pixels with high D. Then, in step 550, the pixel value O' at the coordinate (x, y) is stored in the combined image. The combined image is returned in step 555.

Figure 6:
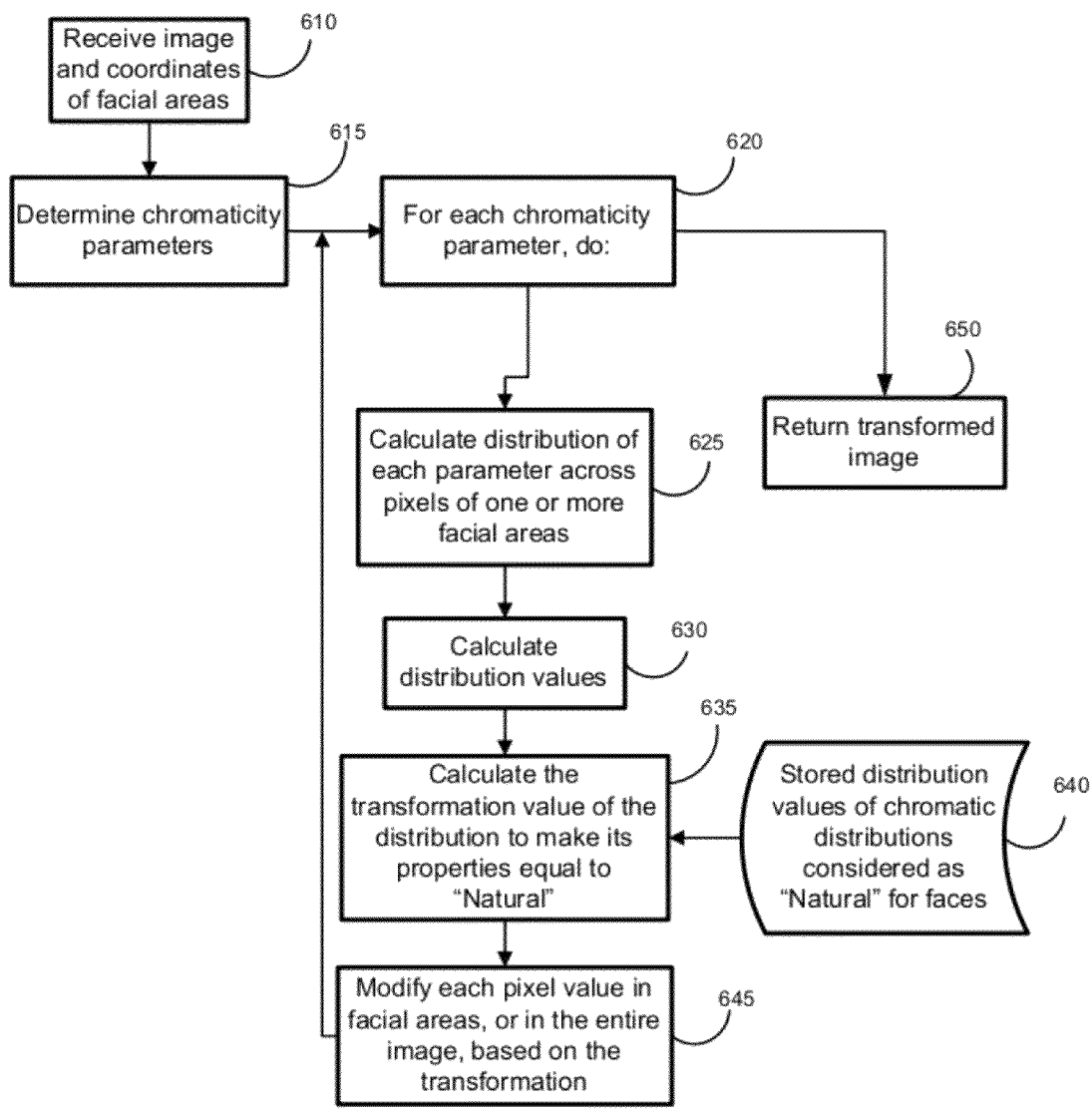
FIG. 6 illustrates a flow chart for calculation and transformation of chromaticity distributions, in accordance with the exemplary embodiment.

FIG. 6 illustrates a flow chart for calculation and transformation of chromaticity distributions, in accordance with the exemplary embodiment. This method is used for color correction of the entire image and the facial areas defined by respective coordinates. An image and coordinates of facial area are received in step 610. Chromaticity parameters for the image are defined in step 615. The chromaticity parameters can include any component of a given color representation (for example, a* or b* component of CIELAB color model) or a non-linear function of these components.

For each defined chromaticity parameter (see step 620), a distribution of a parameter is calculated across pixels of one or more facial areas of the image in step 625. A largest facial area can be used, or every facial area defined by the coordinates can be processed. The distribution values are calculated in step 630. These values can include a mean parameter value, a peak value, a median value, a standard deviation (i.e., offset) value and any other statistical moment value.

A transformation value of the distribution is calculated in step 635, in order to make the distribution values to equal "natural values". The natural values are pre-stored calculated values for chromatic distribution for average faces statistically obtained in step 640. According to the exemplary embodiment, a transformation can implement shifting the distribution to make the value calculated as (peak+mean)/2 to equal to stored "natural" value. The transformation can implement scaling the distribution to make its $k^{th}$ moment equal to stored "natural" $k^{th}$ moment.

Each pixel value in facial areas (or in the entire image) is modified based on the calculated transformation value in step 645. The modification can be non-linear to prevent over saturation of the pixels. For example, if the a* component of CIELAB is used a parameter, and the pixel's a* value can be increased (or decreased) by a lesser degree if it is closer to an upper (or lower) bound of its dynamic range. Pixels belonging to facial skin can be treated differently. For example, the skin pixels can be treated more proportionally that the non-skin pixels. The skin pixels can be determined, for example, using a statistical model of distribution of chromaticity parameters. A transformed image is returned in step 650.

Figure 7A:
FIGS. 7A-7B illustrate an exemplary portrait image before and after image enhancement processing.
Figure 7B:

FIGS. 7A-7B illustrate exemplary portrait images before and after image enhancement processing including removal of facial blemishes and pimples.

Figure 8A:
FIGS. 8A-8B illustrate another exemplary portrait image before and after image enhancement processing.
Figure 8B:
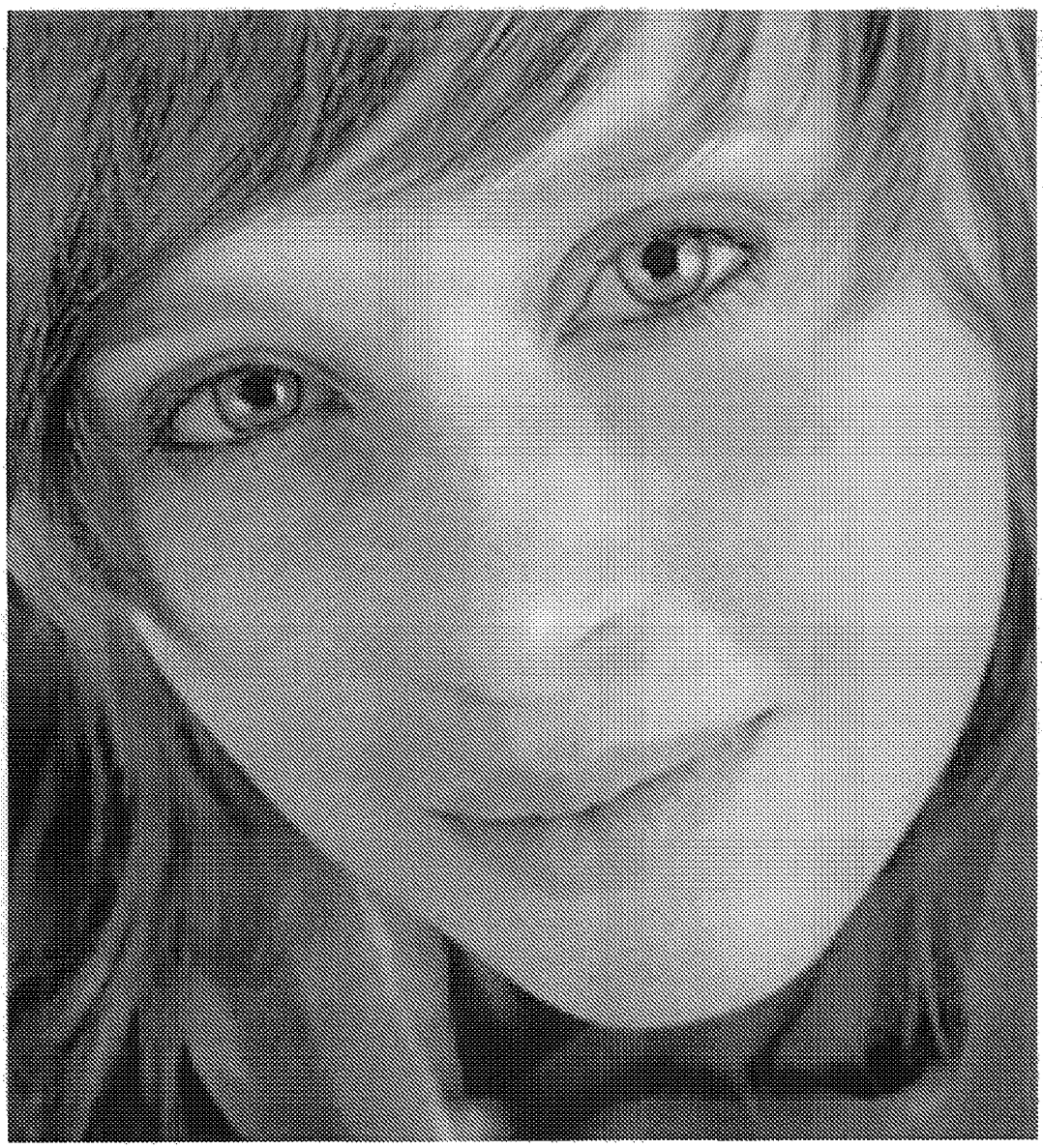

FIGS. 8A-8B illustrate an exemplary portrait image before and after image enhancement processing including freckles removal.

Figure 9:
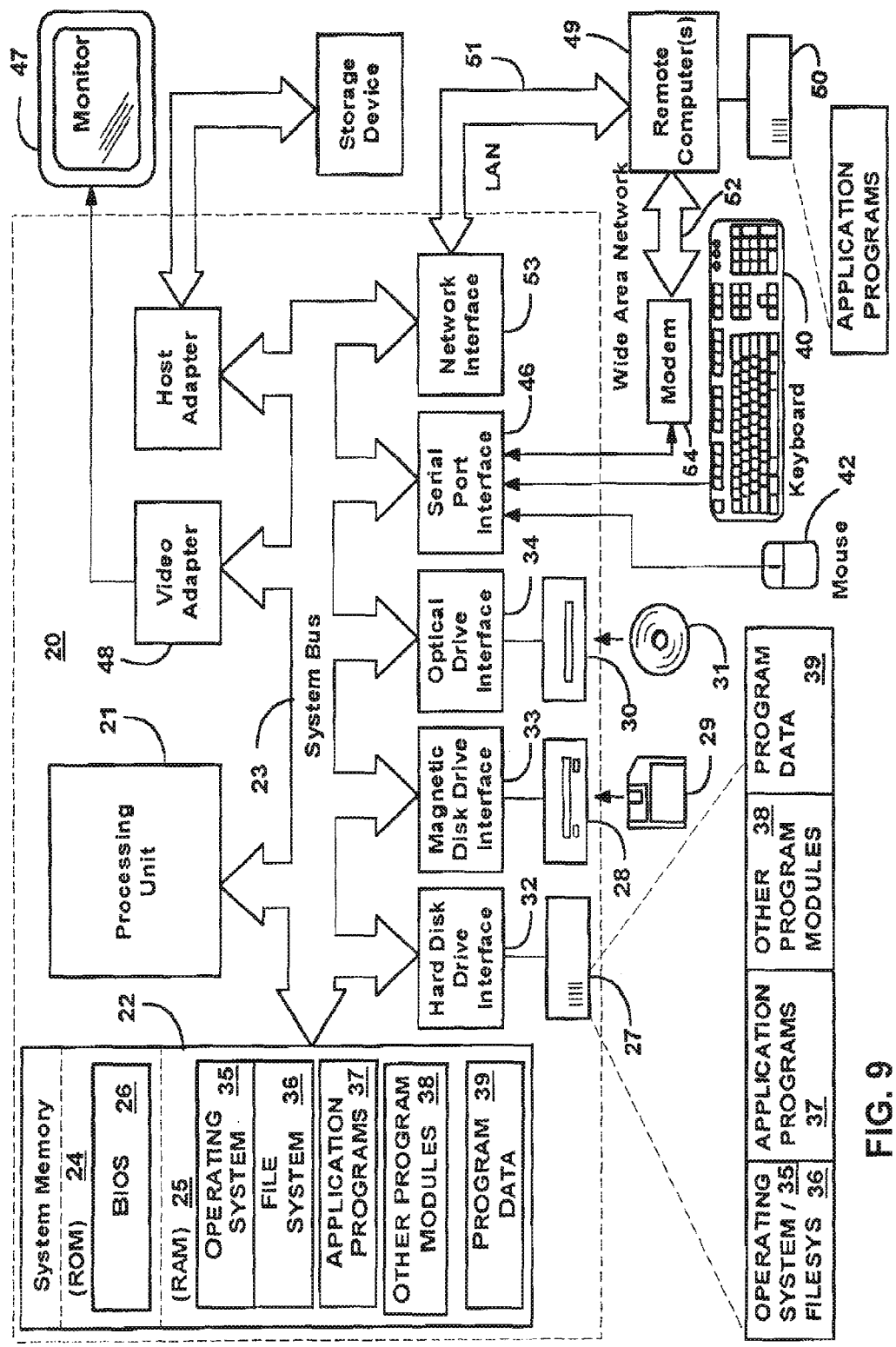
FIG. 9 illustrates a schematic of an exemplary computer system on which the invention can be implemented.

With reference to FIG. 9, an exemplary system for implementing the invention includes a general purpose computing device in the form of a computer or a server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Note that the exemplary embodiment can be implemented on a processor of a digital camera or a cell phone. These devices have sufficient memory and can perform calculations needed for implementing the image enhancement method.

Having thus described a preferred embodiment, it should be apparent to those skilled in the art that certain advantages of the described method and apparatus have been achieved. In particular, those skilled in the art would appreciate that the proposed method provides for an effective automated enhancement of facial images or portraits.

It should also be appreciated that various modifications, adaptations and alternative embodiments thereof may be made within the scope and spirit of the present invention. The invention is further defined by the following claims.

What is claimed is:

1. A method for enhancing a facial image, the method comprising:
    (a) receiving an original image;
    (b) converting the original image into a device-independent color model;
    (c) processing the converted image through a skin recognition filter;
    (d) detecting faces in the converted image;
    (e) processing the converted image using wrinkle reducing parameters,
    wherein an initial filtering radius and a final filtering radius are set, and repeating steps (c)-(e) while the initial filtering radius is increased until the initial filtering radius reaches the final filtering radius;
    (f) reducing blemishes in the converted image;
    (g) calculating at least one chromaticity distribution in a facial area of the converted image; and
    (h) analyzing the chromaticity distribution and modifying the facial areas of the converted image based on the distribution analysis.

2. The method of claim 1, further comprising:
    (i) receiving filtering parameters; and
    (iii) al determining a type of an imperfection for each pixel of faces based on a color of the pixel and the initial filtering radius.

3. The method of claim 2, further comprising:
    (iii) reducing the imperfection with parameters for a light imperfection on a dark surrounding, if the imperfection is a light imperfection on a dark surrounding,
    (iv) reducing the imperfection with parameters for a dark imperfection on a light surrounding, if the imperfection is a dark imperfection on a light surrounding; and
    (v) combining filtered image with the original image.

4. The method of claim 2, wherein the determining of the type of the imperfection step (ii) comprises:
    (1) receiving recognition parameters, including coordinates of the pixel, a current radius, a luminosity component of the pixel, a chromaticity component of the pixel;
    (2) retrieving surrounding pixels based on the current radius;
    (3) setting a luminosity threshold value;
    (4) calculating a minimum luminosity and a minimum chromaticity value of the pixel;
    (5) calculating a maximum luminosity value and a maximum chromaticity value of the pixel; and
    (6) calculating a mean value for the luminosity and the chromaticity of the pixel.

5. The method of claim 4, further comprising:
(7) setting an imperfection reduction mode, wherein:
(A) if the pixel luminosity value is less than a sum of the minimum luminosity and the luminosity threshold value, and the chromaticity equals to the mean value, the imperfection is a dark imperfection on a light surrounding; and
(B) if the pixel luminosity value is larger than the maximum luminosity minus the luminosity threshold value, the imperfection is a light imperfection on a dark surrounding;
(8) setting a reduction pixel value for the luminosity and the chromaticity to equal the mean value;
(9) calculating a distance between the pixel and the reduction pixel value using the luminosity and the chromaticity of the pixel;
(10) calculating a reduction strength based on reduction parameters; and
(11) combining the pixel value with the reduction pixel value according to the reduction strength.

6. The method of claim 3, wherein the parameters comprise any of:
a distance;
a radius;
a maximum of a first derivative of surrounding pixels used for body imperfection or wrinkle reducing mode;
a maximum of a second derivative of the surrounding pixels; and
a minimum of the surrounding pixels used for spot/blemishes reducing mode.

7. The method of claim 3, wherein the combining of the filtered image with the original image step (v) comprises:
(vi) determining if the pixel in the filtered image is brighter than in the original image;
(vii) if the pixel is brighter, setting combining parameters based on the dark imperfection on the light surrounding; and
(viii) if the pixel is darker, setting combining parameters based on the light imperfection on the dark surrounding.

8. The method of claim 7, further comprising:
(ix) calculating a difference between a luminosity of the filtered pixel and the original pixel;
(x) generating a final pixel value, by nonlinearly combining the luminosity and a chromaticity of the original pixel and the filtered pixel; and
(xi) storing coordinates of the final pixel in a combined image.

9. The method of claim 1, further comprising color correcting the converted image, including:
(I) receiving coordinates of a facial image;
(II) determining chromaticity parameters of all pixels;
(III) storing natural chromatic distribution values statistically obtained for average facial images;
(IV) generating a distribution of each chromaticity parameter across pixels of the facial image.

10. The method of claim 9, further comprising:
(V) calculating properties of the distribution of each chromaticity parameter;
(VI) calculating a transformation value of the distribution of each chromaticity parameter such that the transformation value makes the distribution properties equal to the stored natural chromatic distribution values; and
(VII) modifying the value of each pixel of the facial image.

11. The method of claim 10, wherein the distribution values are any of:
a mean chromaticity parameter value;
a peak chromaticity parameter value;
a median chromaticity parameter value; and
a standard deviation chromaticity parameter value.

12. A computer program product comprising a non-transitory computer readable storage medium storing computer executable code for implementing the steps of claim 1.

13. A system for enhancing a facial image, the system comprising:
a processor;
a memory coupled to the processor;
a computer program logic stored in the memory and executed on the processor, the computer program logic for implementing:
(a) receiving an original image;
(b) converting the original image into a device-independent color model;
(c) processing the converted image through a skin recognition filter;
(d) detecting faces in the converted image;
(e) processing the converted image using wrinkle reducing parameters,
wherein an initial filtering radius and a final filtering radius are set, and repeating steps (c)-(e) while the initial filtering radius is increased until the initial filtering radius reaches the final filtering radius;
(f) processing the converted image using blemish reducing parameters;
(g) calculating at least one chromaticity distribution in a facial area of the converted image; and
(h) analyzing the chromaticity distribution and modifying the facial areas of the converted image based on the distribution analysis.

* * * * *